United States Patent Office 3,470,227
Patented Sept. 30, 1969

3,470,227
PROCESS FOR THE PRODUCTION OF XYLYLENE DIISOCYANATE
Hiroshi Hatta, Osaka, and Hiroshi Mukai, Suita, Japan, assignors to Takeda Chemical Industries, Ltd., Osaka, Japan
No Drawing. Filed Sept. 6, 1966, Ser. No. 577,170
Claims priority, application Japan, Sept. 6, 1965, 40/54,823; Aug. 20, 1966, 41/54,909
Int. Cl. C07c 119/04
U.S. Cl. 260—453      4 Claims

ABSTRACT OF THE DISCLOSURE

Process for the production of xylylene diisocyanate by phosgenating xylylene diamine with at least 2.5 moles of phosgene per mole of xylylene diamine in an inert solvent at a temperature of 0° to about 50° C. and then maintaining the temperature of the reaction mixture between about 120° C. to 180° C. under a pressure of 2 to about 5 kg./cm.$^2$ gauge. By carrying out the reaction within the aforementioned parameters, undesirable chlorinated and resinous by-products are reduced, thereby producing high yields of relatively pure xylylene diisocyanate.

---

The present invention relates to a process for the production of xylylene diisocyanate, and more particularly to the production of xylylene diisocyanate by the phosgenation of xylylene diamine under pressure.

It is well known that organic isocyanate may be prepared by reacting phosgene with a primary amine corresponding to the desired isocyanate.

Aromatic isocyanate can easily be prepared in a pure state and in a high yield by introducing phosgene into a suspension or solution of the corresponding aromatic amine or salt thereof to allow a phosgenation to take place. However, when this procedure is applied to the production of aliphatic isocyanate, there are encountered such drawbacks as that it takes a rather long time to complete the reaction, and that such by-products as chlorinated compounds produced by deamination caused in the course of the phosgenation and resinous substances having a high boiling point are produced in an amount of about 20 to 40% in total, and therefore the desired aliphatic isocyanate is produced merely in a low yield. The resinous by-products can be rather easily removed by distillation, but the chlorinated by-products must be separated by rectification, which causes further decrease of yield of the desired product.

Xylylene diisocyanate of the formula

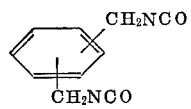
(I)

is useful for the production of polyurethane products and is prepared by phosgenation of xylylene diamine of the formula

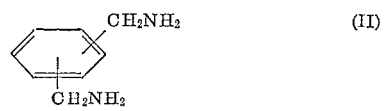
(II)

But xylylene diamine acts as an aliphatic amine, and thus the aforementioned drawbacks are encountered on preparing xylylene diisocyanate by phosgenation of the said diamine.

Many attempts have been made for the purpose of avoiding the said drawbacks, but none of these has been able fully to accomplish the purpose in view.

The present invention is based on the unexpected new finding that the xylylene diisocyanate can be prepared in a high yield with the production of only a small amount of by-products by phosgenation of xylylene diamine under specified conditions, specified molar ratio of the amine to phosgene, and specified reaction pressure and reaction temperature in combination.

It is a primary object of this invention to provide a new and improved process for producing xylylene diisocyanate.

In other words, the object of the present invention is to produce xylylene diisocyanate in a high yield with production of only a small amount of by-products such as chlorinated by-products and resinous by-products.

Still other objects will appear hereinafter.

The objects of the present invention can be realized by subjecting xylylene diamine to phosgenation, in which so-called hot phosgenation is carried out with the use of phosgene in an amount of not less than 2.5 moles relative to the xylylene diamine at a temperature of about 120° to 180° C. under a pressure of about 2 to about 5 kg./cm.$^2$ gauge in an inert solvent. (The expression "kg./cm.$^2$" signifies kilograms per square centimeter.) The xylylene diamine II employed in the present invention includes meta-xylylene diamine, para-xylylene diamine, and ortho-xylylene diamine, and mixtures thereof. As the inert solvent in the present invention, any one may be used, insofar as it does not disturb the phosgenation, and generally solvents such as hydrocarbons and chlorinated hydrocarbons can be used. Among these, chlorinated aromatic hydrocarbons, especially chlorobenzenes such as monochlorobenzene, dichlorobenzene, and trichlorobenzene, etc., give best results.

More concretely, in the present invention, the phosgenation is carried out by first mixing phosgene with xylylene diamine in the ratio of not less than 2.5 moles of phosgene per mole of xylylene diamine in an inert solvent at a temperature of from about 0° to about 50° C., and then keeping the reaction mixture at a temperature within a range from about 120° to about 180° C., advantageously at from about 130° to about 150° C., under a pressure of from about 2 to about 5 kg./cm.$^2$ gauge.

The mixing of the starting materials is carried out by flowing gaseous phosgene into xylylene diamine dissolved in an inert solvent or by mixing phosgene dissolved in an inert solvent with xylylene diamine dissolved in an inert solvent, the latter procedure giving best results.

In the present invention, adjustment of reaction pressure on hot phosgenation is realized by releasing hydrogen chloride gas generated in the course of the phosgenation from the sealed reaction apparatus through a gas-regulator valve to keep the reaction pressure at a constant value.

In the case of hot phosgenation under atmospheric pressure or under less than 2 kg./cm.$^2$ gauge pressure, the reaction proceeds very slowly and a large amount of chlorinated by-products are produced, and furthermore it is difficult to reflux phosgene by means of a brine condenser due to its low boiling point.

In the case of phosgenation under a pressure higher than 5 kg./cm.$^2$ gauge, the amount of both chlorinated by-products and resinous by-products again increases. In the case of phosgenation at a temperature above 180° C., there is found a remarkable increase in the amount of chlorinated by-products and resinous by-products.

On the contrary, the reaction at a temperature below 120° C. requires a very long time for completion, and there is also found an increase in an amount of the above-mentioned by-products.

The amount of phosgene to be used in the present invention is, as stated above, not less than about 2.5 moles relative to the xylylene diamine, and not more than about 10.0 moles; more especially, about 2.5 to about 6.0 moles are used. In case of less than about 2.5 moles, the desired product is produced only in greatly reduced yield due to incomplete phosgenation. The use of phosgene in an amount of more than about 10 moles is disadvantageous from an industrial point of view and moreover too large excess of phosgene tends to reduce the yield of the product.

However, the desired xylylene diisocyanate is optimally produced under the precedingly recited conditions according to this invention.

In accordance with the present invention, the reaction is carried out smoothly and chlorinated by-products decrease to 1.0–2.5% (by weight) and resinous by-products also decrease to 8–12% (by weight) and the yield of xylylene diisocyanate is considerably increased to more than 85%; moreover, the reaction time is shortened. Furthermore, the amount of employed phosgene can be reduced to half of that employed in prior processes; so that much smaller apparatus for recovery of the phosgene can be employed. Furthermore, it is easy to reflux the phosgene by means of a brine condenser.

The following examples represent presently preferred illustrative embodiments of the invention.

EXAMPLE 1

44 parts by weight of phosgene is dissolved into 52 parts by weight of ortho-dichlorobenzene charged in a phosgenation apparatus, under cooling with a brine condenser to −10° C., and 15 parts by weight of meta-xylylene diamine dissolved in 78 parts by weight of ortho-dichlorobenzene is added dropwise to the phosgene solution at a temperature of not higher than 50° C.; then the apparatus is sealed, and the phosgenation solution is stirred for 2 hours at the same temperature.

Subsequently, further phosgenation is effected by keeping the reaction mixture at a temperature of 150° C. for 3 hours while adjusting the inner pressure at 3 kg./cm.$^2$ gauge by releasing hydrogen chloride gas produced in the course of the phosgenation.

After the phosgenation is completed, gaseous substance is removed from the reaction system, and then excess phosgene is removed by distillation. After distilling off the solvent, the reaction product is purified by fractional distillation under reduced pressure to severally obtain 90.6% w./w. of meta-xylylene diisocyanate, 0.9% w./w. of chlorinated by-products and 8.8% w./w. of resinous by-products. Thus obtained meta-xylylene diisocyanate is colorless and odorless liquid having a boiling point of 115° C./1 mm. Hg.

EXAMPLE 2

A mixture of 15 parts by weight of mixed xylylene diamines (containing 26% w./w. of para-xylylene diamine and 74% w./w. of meta-xylylene diamine) and 65 parts by weight of ortho-dichlorobenzene is added to 33 parts by weight of phosgene dissolved in 52 parts by weight of ortho-dichlorobenzene at a temperature of not higher than 50° C., followed by stirring at the same temperature for 1½ hours.

Subsequently, further phosgenation is effected by keeping the reaction mixture at a temperature of 130° C. under a pressure of 5 kg./cm.$^2$ gauge for 3.5 hours, whereupon colorless liquid is obtained. The reaction products are treated in the same manner as in Example 1 to obtain 1.5% w./w. of chlorinated by-products, 87.5% w./w. of mixed xylylene diisocyanates (containing 25% w./w. of para-xylylene diisocyanate and 75% w./w. of meta-xylylene diisocyanate) and 11.0% w./w. of resinous by-products.

EXAMPLE 3

15 parts by weight of para-xylylene diamine dissolved in 65 parts by weight of monochlorobenzene is added to 48 parts by weight of phosgene dissolved in 44 parts by weight of monochlorobenzene at a temperature of not higher than 50° C., followed by stirring at the same temperature for 2 hours.

Subsequently, further phosgenation is effected by keeping the reaction mixture at a temperature of 140° C. under a pressure of 3 kg./cm.$^2$ gauge for 3 hours, whereupon colorless liquid is obtained.

The reaction products are treated in the same manner as in Example 1 to obtain 9.0% w./w. of para-xylylene diisocyanate having a boiling point of 154° C./6 mm. Hg, 1.0% w./w. of chlorinated by-products and 9.0% w./w. resinous by-products.

EXAMPLE 4

15 parts by weight of meta-xylylene diamine dissolved in 65 parts by weight of ortho-dichlorobenzene is added to 48 parts by weight of phosgene dissolved in 33 parts by weight of ortho-dichlorobenzene at a temperature of not higher than 50° C., followed by stirring at the same temperature for 2 hours.

Subsequently, further phosgenation is effected by keeping the reaction mixture at a temperature of 140° C. under a pressure of 2 kg./cm.$^2$ gauge for 4 hours, whereupon colorless liquid is obtained.

The reaction products are treated in the same manner as in Example 1 to obtain 86.8% w./w. of meta-xylylene diisocyanate, 2.3% w./w. of chlorinated by-products and 10.4% w./w. resinous by-products.

For showing further the excellency of the method of this invention, the examples summed up in the following Tables I and II were conducted in the same manner as the above examples:

TABLE 1

| Example No. | Pressure (kg./cm.² gauge) | Temperature (° C.) | Amount of phosgene (mol) relative to 1 mol of xylylene diamine | Analysis of reaction products | | |
|---|---|---|---|---|---|---|
| | | | | Xylylene diisocyanate (percent) | Chlorinated by-products (percent) | Resinous by-products (percent) |
| 5 | 0 | 140 | 2.5 | 74.0 | 5.5 | 20.5 |
| 6 | 0 | 140 | 4.0 | 77.5 | 3.1 | 19.4 |
| 7 | 0 | 140 | 6.0 | 76.0 | 4.0 | 20.0 |
| 8 | 0 | 140 | 10.0 | 75.8 | 4.8 | 19.4 |
| 9 | 1.0 | 140 | 2.5 | 73.9 | 3.3 | 22.8 |
| 10 | 1.0 | 140 | 4.0 | 80.1 | 2.9 | 17.0 |
| 11 | 1.0 | 140 | 5.0 | 79.6 | 2.9 | 17.5 |
| 12 | 2.0 | 140 | 2.5 | 86.8 | 2.3 | 10.4 |
| 13 | 2.0 | 140 | 4.0 | 90.6 | 1.0 | 8.4 |
| 14 | 2.0 | 140 | 5.0 | 90.0 | 1.6 | 8.4 |
| 15 | 2.0 | 140 | 8.0 | 79.5 | 2.9 | 17.6 |
| 16 | 3.0 | 140 | 2.5 | 87.0 | 2.0 | 11.0 |
| 17 | 3.0 | 140 | 4.0 | 90.0 | 1.0 | 9.0 |
| 18 | 3.0 | 140 | 5.0 | 90.3 | 1.1 | 8.6 |
| 19 | 3.0 | 140 | 6.0 | 90.0 | 1.5 | 8.5 |
| 20 | 3.0 | 140 | 8.0 | 84.9 | 2.0 | 13.1 |
| 21 | 4.0 | 140 | 2.5 | 86.5 | 1.3 | 12.2 |
| 22 | 4.0 | 140 | 4.0 | 90.6 | 0.9 | 8.5 |
| 23 | 4.0 | 140 | 5.0 | 90.3 | 1.2 | 8.5 |
| 24 | 4.0 | 140 | 8.0 | 85.0 | 2.0 | 13.0 |
| 25 | 5.0 | 140 | 3.0 | 87.5 | 1.5 | 11.0 |
| 26 | 5.0 | 140 | 4.0 | 88.1 | 1.4 | 10.5 |
| 27 | 5.0 | 140 | 5.0 | 87.8 | 1.6 | 10.6 |
| 28 | 5.0 | 140 | 8.0 | 83.3 | 2.7 | 14.0 |
| 29 | 6.0 | 140 | 2.5 | 83.8 | 2.1 | 14.1 |
| 30 | 6.0 | 140 | 4.0 | 84.6 | 1.8 | 13.6 |
| 31 | 6.0 | 140 | 8.0 | 83.1 | 1.9 | 15.0 |

Time in each of Examples 5 to 31 was 2.0 to 2.5 hours.

TABLE II

| Example No. | Pressure (kg./cm.² gauge) | Amount of phosgene (mol) relative to 1 mol of xylylene diamine | Temperature (° C.) | Time (hours) | Analysis of reaction products | | |
|---|---|---|---|---|---|---|---|
| | | | | | Xylylene diisocyanate (percent) | Chlorinated by-products (percent) | Resinous by-products (percent) |
| 32 | 3.5 | 4.0 | 100 | 8.5 | 77.8 | 7.1 | 15.1 |
| 33 | 3.5 | 4.0 | 120 | 4.0 | 86.7 | 2.1 | 11.2 |
| 34 | 3.5 | 4.0 | 140 | 2.5 | 90.6 | 0.9 | 8.5 |
| 35 | 3.5 | 4.0 | 160 | 2.0 | 80.2 | 1.4 | 18.4 |
| 36 | 3.5 | 4.0 | 180 | 1.5 | 76.6 | 3.1 | 20.3 |
| 37 | 3.5 | 4.0 | 200 | 0.5 | 70.6 | 4.0 | 25.4 |

Percentages in Tables I and II are by weight.

We claim:
1. In a process for the production of xylylene diisocyanate by phosgenation of xylylene diamine, the improvement of carrying out the phosgenation first by mixing phosgene with xylylene diamine in a ratio of about 2.5 to about 10 moles of phosgene per mole of xylylene diamine in an inert solvent at a temperature of about 0° to about 50° C., and then keeping the reaction mixture at a temperature of about 120° to about 180° C. under a pressure of about 2 to about 5 kg./cm.² gauge.

2. A process as claimed in claim 1, wherein the phosgenation is carried out first by mixing phosgene with xylylene diamine in a ratio of about 2.5 to about 6 moles of phosgene per mole of xylylene diamine in an inert solvent at a temperature of about 0° to about 50° C., and then keeping the reaction mixture at a temperature of about 130° to about 150° C. under a pressure of about 2 to about 5 kg./cm.² gauge.

3. A process as claimed in claim 1, wherein the inert solvent is dichlorobenzene.

4. A process as claimed in claim 1, wherein the xylylene diamine is meta-xylylene diamine.

References Cited

UNITED STATES PATENTS

| | | | |
|---|---|---|---|
| 2,642,449 | 6/1953 | Morningstar et al. | 260—453 |
| 2,953,590 | 9/1960 | Pfirschke | 260—453 |
| 3,381,025 | 4/1968 | Mitsumori et al. | 260—453 |

CHARLES B. PARKER, Primary Examiner

DOLPH H. TORRENCE, Assistant Examiner

U.S. Cl. X.R.

260—570.9